Aug. 25, 1959
N. B. WATKINS
2,900,714
METHOD OF JOINING SHEET MATERIAL
Filed June 25, 1954
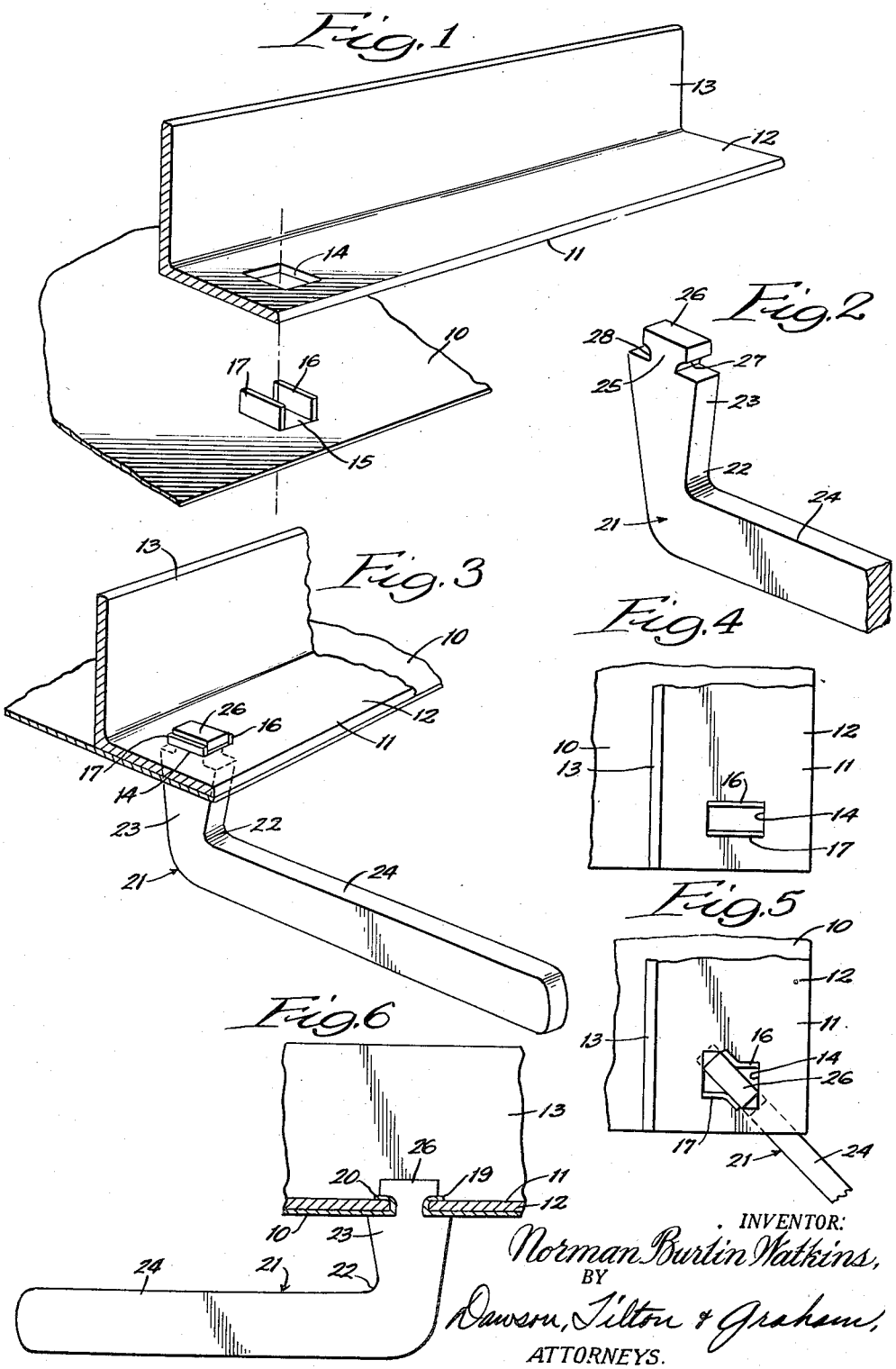
INVENTOR:
Norman Burtin Watkins,
BY
Dawson, Tilton & Graham,
ATTORNEYS.

United States Patent Office 2,900,714
Patented Aug. 25, 1959

2,900,714

METHOD OF JOINING SHEET MATERIAL

Norman Burlin Watkins, Wichita, Kans., assignor to The Coleman Company, Inc., Wichita, Kans., a corporation of Kansas Application June 25, 1954, Serial No. 439,371

4 Claims. (Cl. 29—513)

This invention relates to a method of joining sheet material and to the structure provided thereby. The invention is useful, for example, in the joining of sheet metal members such as relatively thin sheets, and for joining relatively thin sheets to structural members.

An object of this invention is to provide a method for quickly and easily joining sheet material to form a securely united structure. Another object of the invention is to provide a method in which two members of relatively thin flexible material are joined together by providing each with an opening therethrough, one member being equipped with a flange or tongue that extends through the opening in the other member and which is turned laterally to bear against that member. A further object is to join sheet metal members equipped with openings and tongues as described above by placing the members in juxtaposition with the flanges or tongues extending through an opening in the opposite member, and thereafter inserting a cam-equipped head of a locking tool through the openings and subsequently rotating the same to bend the flanges laterally and tighten them against the surface of the opposite member. Additional objects and advantages will appear as the specification proceeds.

An embodiment of the invention is illustrated in the accompanying drawing, in which—

Figure 1 is a perspective view showing the pair of sheet metal members in spaced apart relation; Fig. 2 is a perspective view of a locking tool; Fig. 3 is a perspective view of the plate members in contiguous relation and with the locking tool in operative position; Fig. 4 is a broken top plain view of the sheet metal members in position, one upon the other; Fig. 5 is a top plain view similar to that of Fig. 4 but showing the locking tool in engagement with the flanges; and Fig. 6 is a broken transverse sectional view taken along a line substantially through the center of the openings when the members are together as shown in Fig. 3.

Shown in Fig. 1 are a pair of sheet metal members that are designated with the numerals 10 and 11. The member 10 is relatively flat while the member 11 is generally L-shaped. It should be appreciated that the members 10 and 11 may take on any desired configuration, and the L-shaped channel member and flat plate are shown solely for purposes of illustration. It has been found that the invention is useful in joining sheet metal members that are relatively thin and which are flexible or bendable. It will be apparent, however, that other materials may be employed.

The member 11 as has been stated is generally L-shaped and is equipped with a pair of legs 12 and 13. The leg or wall 12 is provided adjacent an end thereof with an opening 14 therethrough. In the specific illustration, the opening 14 is rectangular, but it will be apparent that the opening might be square or might take on other shapes. The opening 14 may be formed in the member 11 in any suitable manner such as by stamping, etc.

Similarly, the sheet metal member 10 is provided with an opening 15 therethrough. Adjacent the transverse edges of the opening 15, a pair of upwardly or laterally extending flanges or tongues 16 and 17 are provided. The opening and the tongues or flanges may be formed simultaneously by the action of a single punch and die combination.

The opening 15 is slightly smaller than the opening 14 for, as shown in Figures 3 through 5, the members 10 and 11 are placed in contiguous relation with the flanges 16 and 17 extending upwardly through the opening 14. The condition of the members after this operation is illustrated in Fig. 4. Thereafter, the flanges 16 and 17 are bent laterally to provide the lips 19 and 20 as shown in Figure 7.

I prefer to bend the flanges laterally by using a locking tool that is illustrated in perspective in Fig. 2 and which is designated with the numeral 21. The locking tool 21 comprises a crank 22 having an upwardly extending end portion 23 and a generally horizontally extending end portion 24. The crank 22 is equipped with a restricted neck 25 that is preferably formed integrally with the crank and which is equipped at its upper end with a head 26. The neck 25 provides a cam that is operative when the crank is rotated and in the position shown in Figs. 3, 5 and 7 to engage the flanges 16 and 17 and bend them laterally. The cam surfaces are designated with the numerals 27 and 28 and merge at their lower ends with the crank and at their upper ends with the head.

In carrying out the steps of joining the members 10 and 11, the head 26 of the crank is inserted through the openings 14 and 15 as shown in Fig. 3. Next, the crank is rotated and during this operation the cam surfaces of the neck engage the flanges 16 and 17 as shown in Fig. 5, and after 180 degrees of rotation the flanges are bent flat against the upper surface of the member 11 and the lips 19 and 20 are operative to securely join the members 10 and 11.

In the method of the invention then, a pair of members that it is desired to join together are provided with an opening therethrough. One of the members is equipped with a pair of flanges that extend along at least some of the portions of the opening therein, and these flanges are extended through the opening in the other member. The locking tool 21 is then inserted between the flanges 16 and 17, and upon rotation of the tool the flanges are turned laterally and are forced into tight abutting relation with the upper surface of the member they extend through. Thereafter, the locking tool is withdrawn, and it is found that the members so united are rigidly secured together and provide a very strong structure. It will be apparent that the members 10 and 11 may have any number of openings provided therein, and the precise number of openings and flanges required to secure a pair of members together will depend to a large extent upon the size of the members and upon the degree of rigidity required.

The method is effective and is economical for assembly in the field of knocked-down members without the use of bolts, rivets, welding, etc. The prepositioning and number of holes assures correct assembly and the locking tool is expendable.

While in the foregoing specification the embodiment of the invention has been set out in considerable detail for purposes of illustration, it will be apparent to those skilled in the art that numerous changes may be made in these details without departing from the spirit and principles of the invention.

I claim:

1. In a method of joining sheet material, the steps of providing a pair of members with polygonal openings therethrough, providing laterally extending flanges along opposite peripheral portions of one of said openings, bringing said members into abutting relation with said flanges of the one member extending through the opening in the other member, and bending said flanges laterally against the member that they extend through by applying a deforming pressure sequentially across the width of each of said flanges.

2. In a method of joining sheet metal members and the like, the steps of providing a pair of members, forming a generally H-shaped slit in one of said members and turning the resulting tongues laterally to form a generally rectangular opening through that member defined along opposite edges by flanges, forming a complementary opening in the other of said members, extending the laterally turned tongues through said last mentioned opening, and thereafter bending said tongues substantially simultaneously in outward directions and against the surface of said other member to secure said members together.

3. The method of claim 2, in which each of said tongues is bent by applying a deforming force sequentially across the inner face thereof.

4. The method of claim 3, in which the deforming forces are applied initially at opposite corners of the said rectangular openings.

References Cited in the file of this patent

UNITED STATES PATENTS

| | | |
|---|---|---|
| 1,141,046 | Dubus | May 25, 1915 |
| 1,450,961 | Otterbein | Apr. 10, 1923 |
| 1,580,278 | Bartels | Apr. 13, 1926 |
| 1,808,040 | Hyatt | June 2, 1931 |
| 1,855,602 | Kerner | Apr. 26, 1932 |
| 1,906,385 | Ledig | May 2, 1933 |
| 2,160,598 | Melrath | May 30, 1939 |
| 2,548,414 | Wilson | Apr. 10, 1951 |
| 2,638,025 | Nelson | May 12, 1953 |
| 2,653,687 | Churchill | Sept. 29, 1953 |
| 2,663,072 | Pfistershammer | Dec. 22, 1953 |

OTHER REFERENCES

Watson Abstract of Appl. Ser. No. 153,125, pub. Aug. 5, 1952 (661 O.G. 310).